(12) United States Patent
Kashai et al.

(10) Patent No.: US 8,448,112 B1
(45) Date of Patent: May 21, 2013

(54) SYSTEM, METHOD, AND COMPUTER PROGRAM PRODUCT FOR AUTOMATIC POWER MANAGEMENT VERIFICATION

(75) Inventors: Yaron Kashai, Sunnyvale, CA (US); John Paul Decker, Annandale, NJ (US); Neyaz Khan, Plano, TX (US); Efrat Shneydor, Modiin (IL)

(73) Assignee: Cadence Design Systems, Inc., San Jose, CA (US)

( * ) Notice: Subject to any disclaimer, the term of this patent is extended or adjusted under 35 U.S.C. 154(b) by 49 days.

(21) Appl. No.: 13/082,970

(22) Filed: Apr. 8, 2011

(51) Int. Cl.
*G06F 17/50* (2006.01)
*G06F 9/455* (2006.01)
*G06F 11/22* (2006.01)

(52) U.S. Cl.
USPC ............................ 716/109; 716/104; 716/136

(58) Field of Classification Search
USPC ......................................... 716/109, 104, 136
See application file for complete search history.

(56) References Cited

U.S. PATENT DOCUMENTS

| 6,415,416 | B1 * | 7/2002 | Fujiwara et al. | 716/108 |
|---|---|---|---|---|
| 7,024,649 | B2 * | 4/2006 | Collmeyer et al. | 716/139 |
| 2004/0172603 | A1 * | 9/2004 | Collmeyer et al. | 716/1 |
| 2011/0197172 | A1 * | 8/2011 | Yamamoto et al. | 716/111 |

OTHER PUBLICATIONS http://en.wikipedia.org/wiki/Common_Power_Format, downloaded on Mar. 24, 2011, pp. 1-2.
http://www.unifiedpowerformat.com/, downloaded on Apr. 1, 2011, pp. 1 of 1.
Carter, Hamilton B., et al., "Metric Driven Design Verfication", 2007, XXVII, ISBN: 978-0-387-38151-0, pp. 1-362.
IEEE Standard for the Functional Verification Language e Institute of Electrical and Electronics Engineers/03—Aug. 2008, ISBN: 9780738154251; pp. 1-371.
http://www.systemverilog.org/, downloaded on Apr. 1, 2011, pp. 1 of 1.
http://www.systemc.org/home/, downloaded on Apr. 1, 2011, pp. 1-2.
http://www.uvmworld.org/, downloaded on Apr. 1, 2011, pp. 1 of 1.
http://www.eda.org/ieee-1850/, downloaded on Apr. 1, 2011, pp. 1-4.
http://www.systemverilog.org/pdf/3A_AssertionsOverview.pdf, downloaded on Apr. 1, 2011, pp. 157-182.

* cited by examiner

*Primary Examiner* — Thuan Do
*Assistant Examiner* — Magid Dimyan
(74) *Attorney, Agent, or Firm* — Holland & Knight LLP; Mark H. Whittenberger

(57) ABSTRACT

The present disclosure relates to a computer-implemented method for automatically generating a power management verification component. The method may include receiving one or more inputs including a power intent definition. The method may further include automatically generating a power management verification environment based upon, at least in part, the power intent definition, the power management verification environment including at least one of a driver and a monitor.

18 Claims, 9 Drawing Sheets

FIG. 8

SYSTEM, METHOD, AND COMPUTER PROGRAM PRODUCT FOR AUTOMATIC POWER MANAGEMENT VERIFICATION

FIELD OF THE INVENTION

The present disclosure relates to power management, and more specifically, to a method for automatically generating a verification component for verifying power management aspects of an electronic design.

DISCUSSION OF THE RELATED ART

Most new chip designs have some low power features built in, for example the ability to turn off power to circuits that are not being used temporarily. Such designs may contain power management logic that performs the switching of supplies.

The power management design intent may be captured in a formal way using a standard format such as Common Power Format (CPF) or Unified Power Format (UPF). A variety of proprietary ad-hoc formats may be used as well. For the purposes of this disclosure, these formats and others are referred to herein as power intent definition files (PIDF). A PIDF file may define the various power domains, the different power modes each domain can be in, voltage levels associated with each mode and the sequences of operations needed to switch between power modes of each domain. It may also define interdependencies between modes of different domains.

Verifying that the design meets the specifications defined in the PIDF is a necessary task in the functional verification effort. Erroneous implementation of the power controller may likely impact functionality and may result in a catastrophic failure of the chip. Current state-of-the-art approaches for verifying power management are described below.

Modern system on chip (SoC) verification may be done in two distinct levels. For example, initial verification may be performed at the block or IP level, and final verification may be performed at the SoC level. At the block or IP level, power management may be external to the design under verification (DUV). It is therefore the responsibility of the test bench to supply the power control signals. This may be performed by a bus functional model (BFM) that provides an abstract implementation of the power management sub-system. The power management BFM may be manually created to match the PIDF specifications. Because the system needs to be verified in many operation modes, the power management BFM often include some randomization in picking the control operations and their timing.

At the SoC level, power management may be implemented by one or more controllers embedded in the DUV. At this level, the test bench needs to monitor the operation of the power management sub-system and ensure it adheres to the specification. A special monitor containing a shadow implementation of the power management logic may be added to the test bench. The monitor may report an error in case the DUV implementation disagrees with the monitors internal implementation. Such monitors are hand crafted, in view of the PIDF definition.

Metric driven functional verification is an advanced verification method that requires measuring the coverage achieved while executing the verification process. This type of verification is discussed in detail in "*Metric Driven Design Verification*", Carter, Hamilton B., and Hemmady, Shankar G., Springer, 2007. Coverage measurement is necessary to guide verification so that all functionally important combinations of features are exercised and verified. Because power management interacts with other aspects of functionality, it is important to measure the coverage of the power management operations. The code necessary to collect power management coverage is typically manually added to the test bench.

Low power design imposes a significant burden on the verification effort by requiring custom development of power management BFM, checker and coverage monitor. Because power management schemes tend to change between designs, little or no reuse of such verification components can be achieved.

SUMMARY OF INVENTION

In one or more embodiments of the present disclosure, a computer-implemented method for automatically generating a power management verification component is provided. The method may include receiving one or more inputs including a power intent definition and automatically generating a power management verification environment based upon, at least in part, the power intent definition, the power management verification environment including at least one of a driver and a monitor.

One or more of the following features may be included. In some embodiments, the driver may include a bus functional model (BFM) driver. The monitor may further include a coverage collector. The driver may include a driving controller configured to provide power control signals to a design under verification (DUV). The monitor may include a monitor controller configured to receive power control signals from a design under verification (DUV). The power management verification environment may further include a sequencer configured to generate one or more input test sequences. The power management verification environment may be generated, at least in part, using a parser configured to create an internal data structure representing one or more definitions found in the power intent definition. The internal data structure may undergo at least one of a synthesis phase and a code generation phase.

In one or more embodiments of the present disclosure, a system for automatically generating a power management verification component is provided. In some embodiments, the system may include a computing device having at least one processor configured to receive one or more inputs including a power intent definition. The processor may be further configured to automatically generate a power management verification environment based upon, at least in part, the power intent definition, the power management verification environment including at least one of a driver and a monitor.

One or more of the following features may be included. In some embodiments, the driver may include a bus functional model (BFM) driver. The monitor may further include a coverage collector. The driver may include a driving controller configured to provide power control signals to a design under verification (DUV). The monitor may include a monitor controller configured to receive power control signals from a design under verification (DUV). The power management verification environment may further include a sequencer configured to generate one or more input test sequences. The power management verification environment may be generated, at least in part, using a parser configured to create an internal data structure representing one or more definitions found in the power intent definition. The internal data structure may undergo at least one of a synthesis phase and a code generation phase.

In one or more embodiments of the present disclosure a computer-readable storage medium for automatically generating a power management verification component is provided. The computer-readable storage medium may have stored thereon instructions that when executed by a machine result in one or more operations. Operations may include receiving one or more inputs including a power intent definition and automatically generating a power management verification environment based upon, at least in part, the power intent definition, the power management verification environment including at least one of a driver and a monitor.

One or more of the following features may be included. In some embodiments, the driver may include a bus functional model (BFM) driver. The monitor may further include a coverage collector. The driver may include a driving controller configured to provide power control signals to a design under verification (DUV). The monitor may include a monitor controller configured to receive power control signals from a design under verification (DUV). The power management verification environment may further include a sequencer configured to generate one or more input test sequences. The power management verification environment may be generated, at least in part, using a parser configured to create an internal data structure representing one or more definitions found in the power intent definition. The internal data structure may undergo at least one of a synthesis phase and a code generation phase.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 8 is a diagram depicting an exemplary display showing coverage results collected by a monitor consistent with an embodiment of the present disclosure.

DETAILED DESCRIPTION

Figure 1:
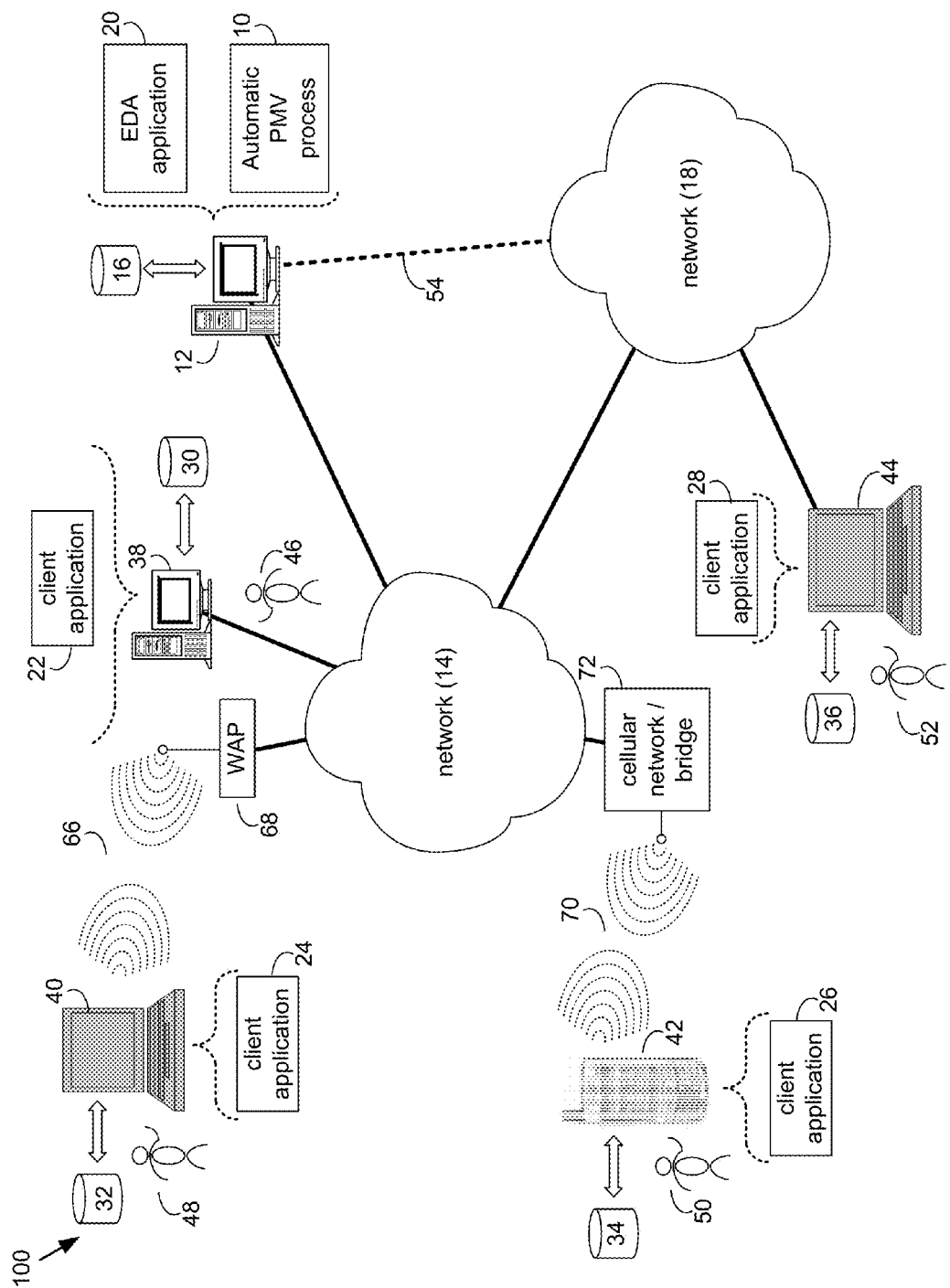
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. For example, one or more of the BFM's described herein may be written in using one or more of these languages. Various other hardware description languages may also be used as well. It should be noted that the verification component generated in accordance with the teachings of the present disclosure may be implemented in an HDL, or in a dedicated Hardware Verification Language (HVL) such as e, Vera or SystemVerilog test bench. In some embodiments, parts may be implemented using an assertion language such as PSL or SystemVerilog assertions (SVA).

Referring to FIG. 1, there is shown automatic power management verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the automatic power management verification process may reside on and be executed, in whole or in part, by a client electronic device, such as a personal computer, notebook computer, personal digital assistant, or the like.

As will be discussed below in greater detail, automatic power management verification process 10 may receive one or more inputs including a power intent definition. Automatic power management verification process 10 may automatically generate a power management verification environment based upon, at least in part, the power intent definition, the power management verification environment including a driver and a monitor.

The instruction sets and subroutines of automatic power management verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Automatic power management verification process 10 may be a stand alone application, or may be an applet/application/script that may interact with and/or be executed within EDA application 20. In addition/as an alternative to being a server-side process, the automatic power management verification process may be a client-side process (not shown) that may reside on a client electronic device (described below) and may interact with an EDA client application (e.g., one or more of EDA client applications 22, 24, 26, 28). Further, the automatic power management verification process may be a hybrid server-side/client-side process that may interact with EDA application 20 and an EDA client application (e.g., one or more of client applications 22, 24, 26, 28). As such, the automatic power management verification process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize automatic power management verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

In some embodiments, automatic power management verification process 10 may provide for an automatic process of creating a power management universal verification component (UVC). The generated UVC may include a BFM-driver, checker and coverage monitor, which may all be configured to reflect one or more definitions found in a PIDF provided as an input. In this way, automatic power management verification process 10 may help to reduce development time by eliminating and/or lessening manual development requirements. Automatic power management verification process 10 may also help to ensure that the verification code matches the design intent captured in the PIDF. In some embodiments, automatic power management verification process 10 may be used at all levels of verification, regardless of whether the power management sub-system is part of the design under verification (DUV).

In some embodiments, most of the information needed to construct the UVC may be available in the PIDF, however some degrees of freedom may remain (e.g., non-deterministic transitions, unspecified delays between transition, etc.). These may be further refined, optionally, by including a power definition constraint file as an additional input. The degrees of freedom that remain in the specification may be addressed in a number of ways. For example, for an input stimulus, constraint driven random generation of control values may be performed. For monitored signals, the monitor may accept any member of a non-deterministic transition set. When transition timing is unspecified, it may not be checked. When timing is specified in terms of bounds, timing may be checked to be within bounds. Features of automatic power management verification process 10 are provided in further detail hereinbelow.

Figure 2:
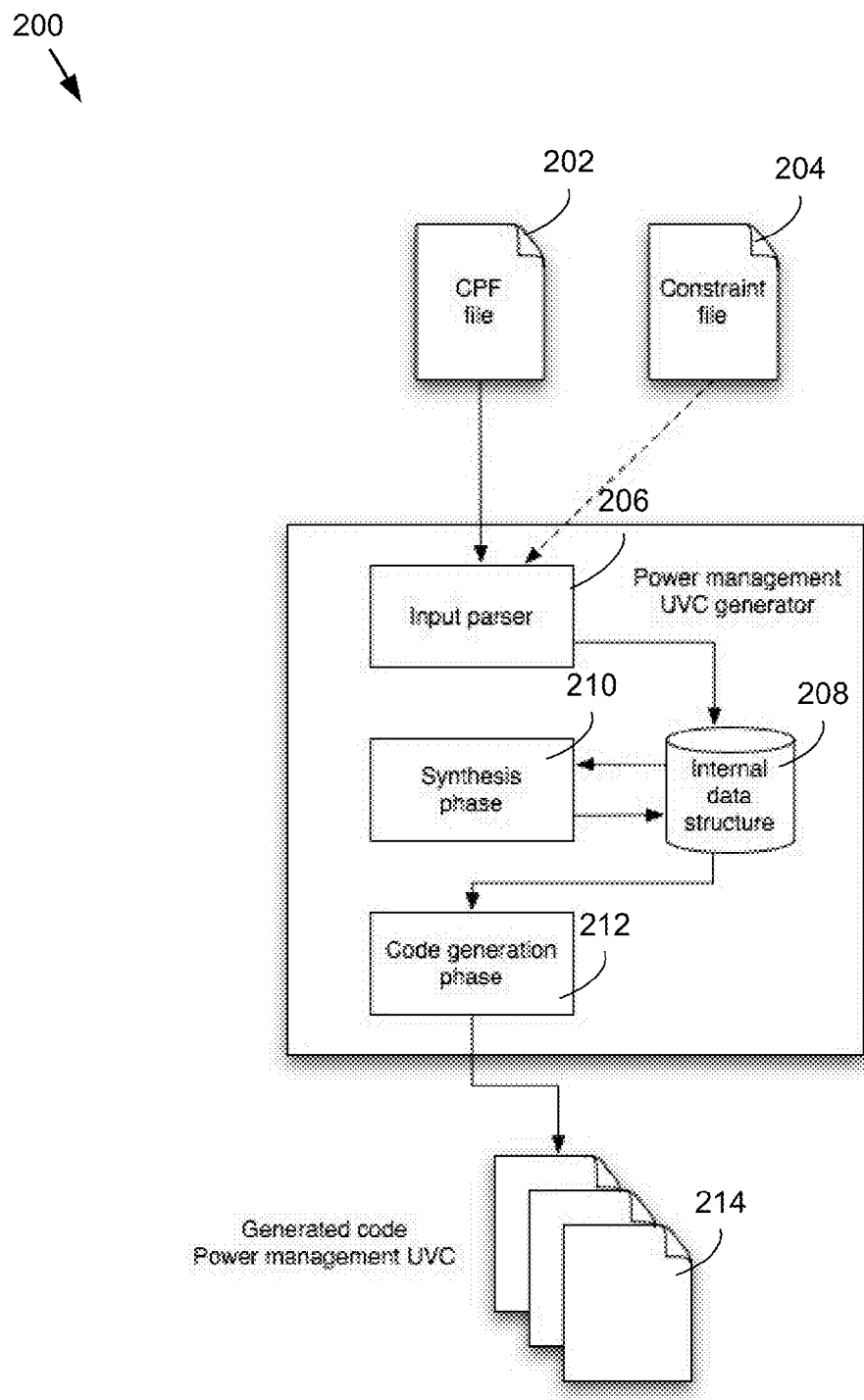
FIG. 2 is a diagram depicting another embodiment of a process in accordance with the present disclosure.

Referring now to FIG. 2, an embodiment of the present disclosure depicting a power management UVC generator 200 is provided. As shown in FIG. 2, the main input file to the process may be a PIDF 202 (in this particular example a CPF file). One example of a CPF file is provided below.

```
set_cpf_version 1.0
set_hierarchy_separator "/"
set_design top
create_power_domain      -name domain_top -default
create_power_domain      -name domain_filter \
                         -instances fir31 \
                         -shutoff_condition {!pcm/pso_en_}
create_isolation_rule    -name rule_iso_filter_default \
                         -from domain_filter \
                         -isolation_condition {!pcm/iso_en_1} \
                         -exclude {fir31/ack_1} \
                         -isolation_output low
```

-continued

```
create_isolation_rule           -name rule_iso_filter_high \
                                -from domain_filter \
                                -isolation_condition {!pcm/iso_en_1} \
                                -pins {fir31/ack_1} \
                                -isolation_output high
create_state_retention_rule     -name rule_rtn_coef_reg \
                                -instances {fir31/coef_reg} \
                                -restore_edge {pcm/save_en_1}
end_design
```

In some embodiments, a hierarchical CPF file that may or may not have hierarchical outputs may be used. For example, a hierarchical block may have its own CPF and power modes that could be tracked separately from the system power mode. There may also be custom power mode control groups that may be tracked. The CPF may grouped hierarchically and by domain.

In some embodiments, UVC generator 200 may receive a secondary input in the form of an optional power definition constraint file 204. Power definition constraint file 204 may add timing information to the control transitions. In some embodiments, power definition constraint file 204 may contain additional information that is needed by the synthesis process and is not present in PIDF file 202. In some embodiments, the optional power definition constrain file 204 may specify minimal and maximal transition times as either absolute times, or clock cycles of a specified clock. An example constraint file is provided below.

```
// This file may contain the constraints to
synthesize power controllers
// Each constraint may provide a minimal
and maximal time delay for
// a specific transition
pgen_constraints power_control
begin
    -iso_before_pwr_dn      [2:6]
    -iso_after_pwr_up       [2:4]
    -ret_after_iso          [1:3]
    -pwr_dn_after_ret       [3:5]
    -restore_after_pwr_up   [1:2]
end
```

The example constraint file is provided above merely for exemplary purposes. In some embodiments, domain specific constraints may be included as well. For example, a large domain may allow more time for the transition from off-on than a small domain. Numerous other constraint file types are also within the scope of this disclosure. It should be noted that the power intent and constraint data may be captured in a single file, as well as split across multiple files without departing from the scope of the present disclosure.

In some embodiments, UVC generator 200 may include an input parser 206, which may be configured to receive at least one of PIDF file 202 and constraint file 204. Input parser 206 may create an internal data structure 208 representing the definitions found in PIDF file 202. Internal data structure 208 may list the power domains, the legal states each domain can be in and the legal transitions between the power states. If a constraint file is present (e.g., constraint file 204), internal data structure 208 may be annotated by attributes and values found in constraint file 204. For example, the minimum and maximum transition times may be annotated on internal data structure 208 representing a transition between power domain states.

Figure 3:
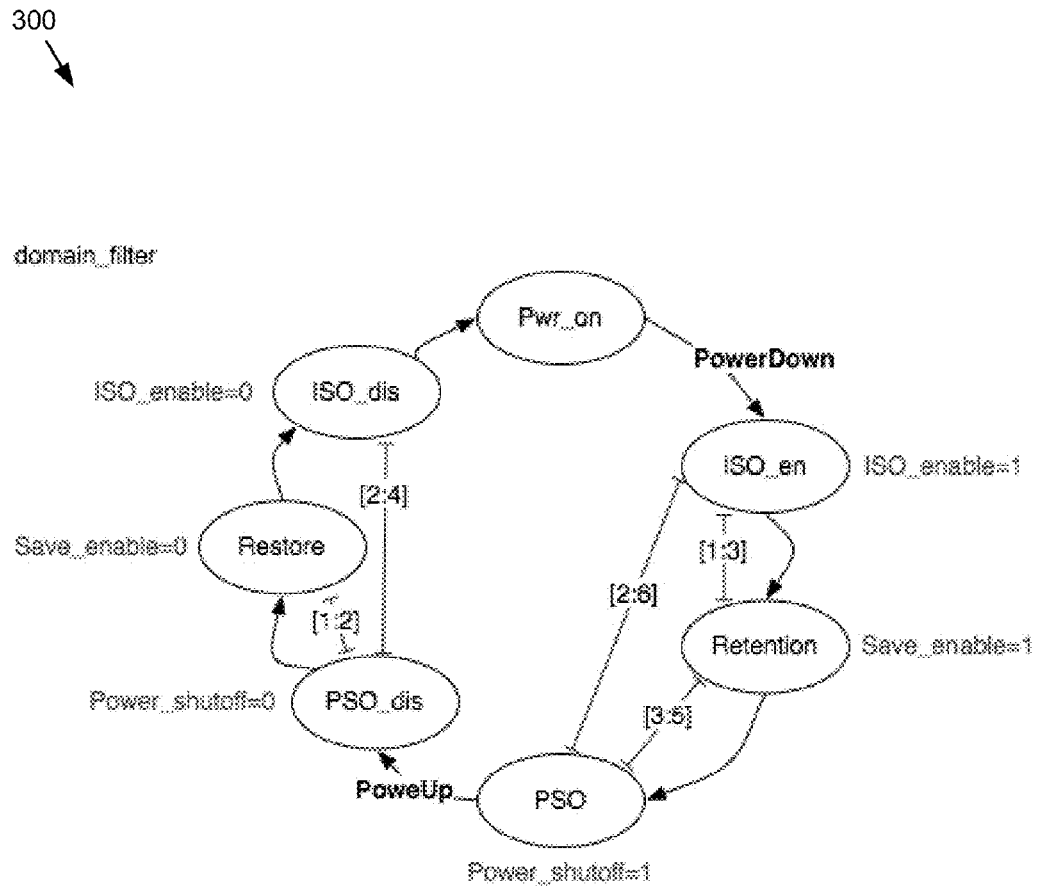
FIG. 3 is a diagram depicting data inferred in an internal data structure in accordance with the present disclosure.

In some embodiments, internal data structure 208 may then be processed by a synthesis phase 210 that may determine the necessary control variables, the values representing each state and the constraints representing interdependent relationships. The output of synthesis phase 210 may be further annotation of the internal data structure 208 with the inferred results. FIG. 3 depicts some of the information inferred in internal data 208 structure as a result of processing the example inputs. The internal data structure 208 may be configured to capture the existing power domains, along with their rules and constraints. During synthesis phase 210 this information may be used to infer a controller state machine for each power domain. The controller state machine may have constraints imposed (illustrated by the interior lines inside the circle shown in the figure). These may be resolved dynamically for driving, and checked with respect to the actual execution timing.

In some embodiments, synthesis phase 210 may be followed by a code generation phase 212. The code generation phase 212 may traverse internal data structure 208 and create code 214 in a verification language that implements the UVC. In one particular embodiment, e code may be generated. However, code in other verification languages including but not limited to SystemVerilog and SystemC may be generated similarly.

In some embodiments, the information captured in PIDF file 202 may be provided as an input into an independent front end processor, such as a simulator front end. The independent front end processor may then provides an application programming interface (API), which may be used by UVC generator 200 to interrogate the power intent data and represent it in the internal data structures mentioned above.

Figure 4:
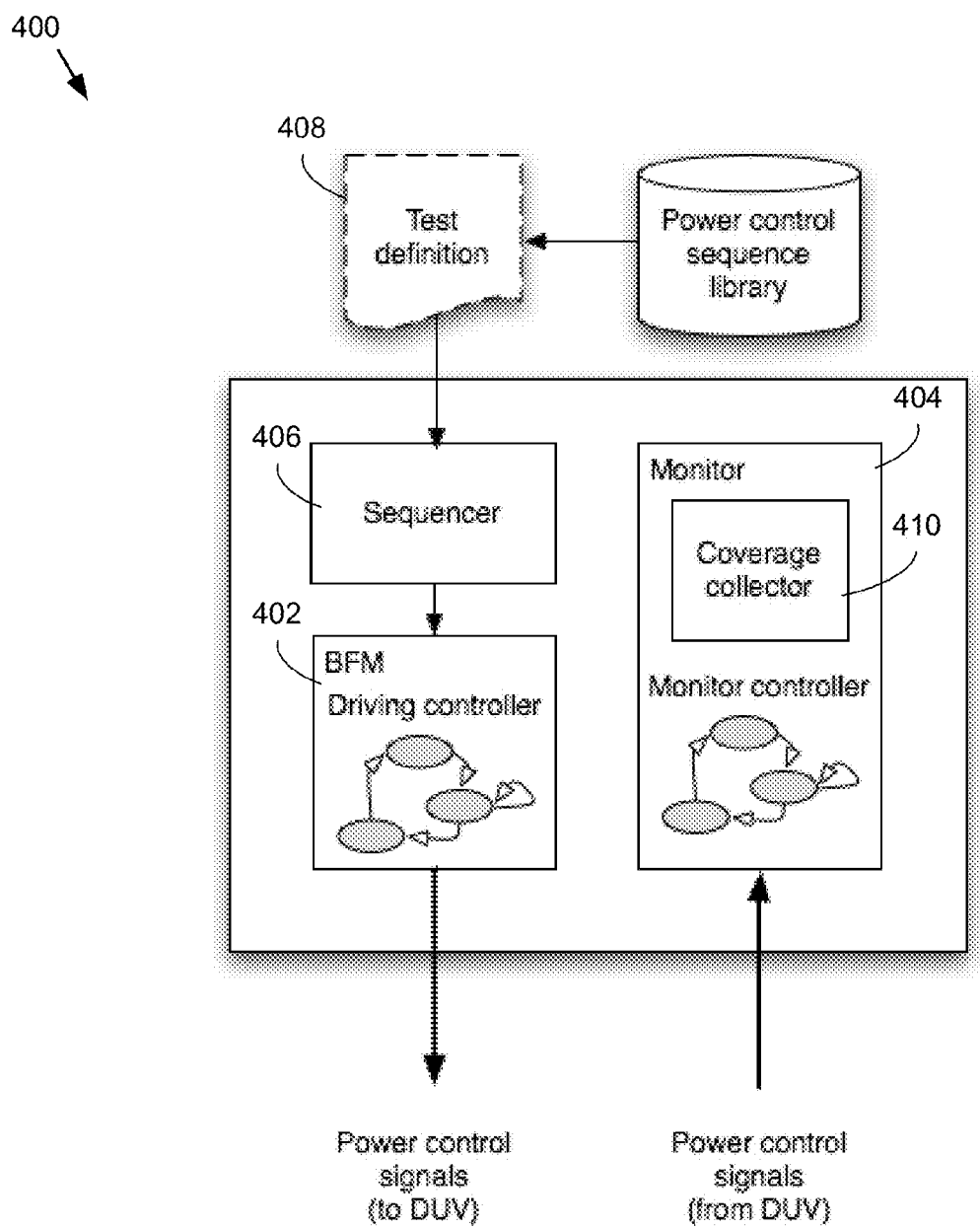
FIG. 4 is a diagram depicting an embodiment of a generated universal verification component consistent with an embodiment of the present disclosure.

Referring now to FIG. 4, an exemplary embodiment depicting a generated UVC architecture 400 is depicted. In some embodiments, the architecture may follow a methodology such as Universal Verification Methodology (UVM).

In some embodiments, generated UVC architecture 400 may include a BFM-driver 402 and a monitor 404 that may be activated independently. The driver path may be active in cases where the test bench needs to drive power control signals into the DUV (e.g., when the power management subsystem is external to the DUV).

In some embodiments, the driver path may consist of a sequencer 406 that may be configured to receive a list of commands from a test definition file 408 that is external to the UVC. Each such command may specify a desired change in the power control state, but may not specify the exact timing or intermediary steps necessary to achieve that state. In some embodiments, sequencer 406 may select commands from the list one at a time, perform necessary random generation to fill in details omitted by the command and pass the command on to BFM 402. In order to perform such functions, sequencer 406 may inspect the power state as maintained by BFM 402, and optionally perform search queries. Some search queries could include but are not limited to "find the shortest path from the current state to state X", "find the path least visited from current state to mode Y", etc.

In some embodiment, BFM 402 may include a driving controller, which may be configured as a state machine that encodes the required power control transitions. In this way, the driving controller may perform a sequence of operations to get the state machine to the state specified by the command. As a side effect the power control signals may be changing values, which may provide the power control stimuli needed to drive the DUV.

In some embodiments, sequencer 406 may be a software sequencer used to control power in systems where such control is implemented by embedded software. In this way, sequencer 406 may trigger a software module that is part of the embedded software implementation, in order to switch power modes in the system. Such triggering may be initiated by software sequencer 406, by means of writing to a memory mapped register or generating an interrupt.

In some embodiments, a virtual sequencer may be created. A virtual sequencer may be used to synchronize the operation of lower level sequences, such as a hardware control and a software control sequences.

In some embodiments, monitor 404 may contain a monitor controller, which may be an independent copy of the state machine encoding the power control transitions. The monitor path may always be on, and may be configured to passively monitor the power control signals. The monitor controller may switch states according to the power control signals value changes. In case a change is unexpected, within the current state of the machine, monitor 404 may issue an error message indicating that the implementation doesn't match the specified power management scheme. The monitor controller may further include coverage collector 410 that may register each state visitation and state transition the monitor controller performs. The coverage data collected may be saved to a standard coverage database for analysis.

One possible example of sample BFM code, implemented in e is provided below.

```
package pcgen;
unit pcgen_bfm {
   -- Reference to the signal map
   !p_smp     : pcgen_smp;
   -- Reference to the sequence driver
   !p_driver  : pcgen_driver_u;
   -- Current data item
   transaction : pcgen_transaction;
   connect_pointers( ) is also {
      p_driver.p_smp = p_smp;
   };
   -- Run phase
   --------------------------
   run( ) is also {
      start initiate_power_cycle( );
   };
   --------------------------
   -- Gets transactions from the driver
   -- and passes them to the BFM.
   initiate_power_cycle( ) @p_smp.clk is {
      while TRUE {
         wait @p_smp.powerdown_e;
         out(sys.time, " --> pcgen_uvc: Start initiate_power_cycle...");
         power_sequence( );
      };
   };
   power_sequence( ) @p_smp.clk is {
      out(sys.time, " --> pcgen_uvc: Receive powerdown-request ...");
      wait [5]*cycle;
      emit p_smp.start_pso_cycle_e;
      out(sys.time, " --> pcgen_uvc: Start of PSO cycle...");
      wait [transaction.pctrl_params.initial_delay]*cycle ;
      out(sys.time, " --> pcgen_uvc: ISO-en signal...");
        p_smp.iso_en_port_sig$ = 1;
      wait [transaction.pctrl_params.ret_after_iso]*cycle ;
      out(sys.time, " --> pcgen_uvc: Retention-en signal...");
        p_smp.save_en_port_sig$ = 1;
      wait [transaction.pctrl_params.iso_before_pwr_dn]*cycle ;
      out(sys.time, " --> pcgen_uvc: PSO-en signal...");
        p_smp.power_shutoff_port_sig$ = 1;
      wait [transaction.pctrl_params.pso_duration]*cycle ;
      out(sys.time, " --> pcgen_uvc: Power-Up signal...");
        p_smp.power_shutoff_port_sig$ = 0;
      wait [transaction.pctrl_params.restore_after_pwr_up]*cycle ;
      out(sys.time, " --> pcgen_uvc: Restore-en signal...");
        p_smp.save_en_port_sig$ = 0;
```

-continued

```
      wait [transaction.pctrl_params.iso_after_pwr_up]*cycle ;
      out(sys.time, " --> pcgen_uvc: ISO-disable signal...");
        p_smp.iso_en_port_sig$ = 0;
      wait [4]*cycle;
   };
};
```

One possible example of sample code used to implement the controller state machine of the monitor is provided below. Again, this sample code is merely provided as one possible example and is not intended to limit the scope of the present disclosure.

```
package pcgen;
type pcgen_mon_fsm_state_t: [
   PWR_UP_S, PSO_RQ1_S, PSO_RQ2_S, ISO_EN_S,
   RET_S, PSO_S, PSO_DIS_S, RES_S, ISO_DIS_S
];
unit pcgen_monitor {
   !p_smp : pcgen_smp;
   -- The following may be used to control whether checks and coverage
   -- collection are performed by the monitor.
   has_checks : bool;
      keep soft has_checks == TRUE;
   has_coverage : bool;
      keep soft has_coverage == TRUE;
   -- State variable for embedded state machine
   state :pcgen_mon_fsm_state_t;
   run( ) is also {
      state = PWR_UP_S; -- initial state
      start mon_fsm( );
   };
   mon_fsm( ) @p_smp.clk is {
      while TRUE {
         case state {
            PWR_UP_S: {
               wait @p_smp.powerdown_e;
               state = PSO_RQ1_S;
            };
            PSO_RQ1_S: {
               wait [5]; -- deterministic
               state = PSO_RQ2_S;
            };
            PSO_RQ2_S: {
               wait rise(p_smp.iso_en_port_sig$);
               state = ISO_EN_S;
            };
            ISO_EN_S: {
               wait rise(p_smp.save_en_port_sig$);
               state = RET_S;
            };
            RET_S: {
               wait rise(p_smp.power_shutoff_port_sig$);
               state = PSO_S;
            };
            PSO_S: {
               wait fall(p_smp.power_shutoff_port_sig$);
               state = PSO_DIS_S;
            };
            PSO_DIS_S: {
               wait fall(p_smp.save_en_port_sig$);
               state = RES_S;
            };
            RES_S: {
               wait fall(p_smp.iso_en_port_sig$);
               state = ISO_DIS_S;
            };
            ISO_DIS_S: {
               wait cycle;
               state = PWR_UP_S;
            };
         };
      };
   };
};
```

One possible example of sample code used to perform monitor checking with an embedded state machine is provided below.

```
extend has_checks pcgen_monitor {
    -- This part may implement checking, using the
    embedded state machine
    run( ) is also {
        start mon_checker( );
    };
    mon_checker( ) @p_smp.clk is {
        while TRUE {
            check that state==PWR_UP_S => (
                p_smp.iso_en_port_sig$ == 0 and
                p_smp.power_shutoff_port_sig$ == 0 and
                p_smp.save_en_port_sig$ == 0
            );
            check that state==ISO_EN_S => (
                p_smp.iso_en_port_sig$ == 1 and
                p_smp.power_shutoff_port_sig$ == 0 and
                p_smp.save_en_port_sig$ == 0
            );
            check that state==RET_S => (
                p_smp.iso_en_port_sig$ == 1 and
                p_smp.power_shutoff_port_sig$ == 0 and
                p_smp.save_en_port_sig$ == 1
            );
            check that state==PSO_S => (
                p_smp.iso_en_port_sig$ == 1 and
                p_smp.power_shutoff_port_sig$ == 1 and
                p_smp.save_en_port_sig$ == 1
            );
            check that state==PSO_DIS_S => (
                p_smp.iso_en_port_sig$ == 1 and
                p_smp.power_shutoff_port_sig$ == 0 and
                p_smp.save_en_port_sig$ == 1
            );
            check that state==RES_S => (
                p_smp.iso_en_port_sig$ == 1 and
                p_smp.power_shutoff_port_sig$ == 0 and
                p_smp.save_en_port_sig$ == 0
            );
            check that state == ISO_DIS_S => (
                p_smp.iso_en_port_sig$ == 0 and
                p_smp.power_shutoff_port_sig$ == 0 and
                p_smp.save_en_port_sig$ == 0
            );
            wait cycle;
        };
    };
};
```

The code provided above is merely an example showing some of the possible checking approaches that may be utilized in accordance with this disclosure. For example, in some embodiments the checking may also check that clocks/resets are stable during power off/standby, etc. In some embodiments, a design aware tool may be configured to generate configuration information for the process described herein. This could be used to check that the clocks/resets are stable and/or may specify the clocks/resets that may need to be stable when a domain powers off.

Additionally and/or alternatively, in the case of multiple isolation rules, the process may be configured to check that once a control condition changes, all other control conditions may also change. Similarly, equivalent control signals may also be verified.

While the example above performs checking as imperative verification code in the e language, such checking can be constructed, in full or in part, by using assertion languages, which may include but are not limited to PSL and SVA.

One possible example of sample code used to perform monitor coverage of the power controller states is provided below.

```
extend has coverage pcgen_monitor {
    -- This part may implement coverage of the power controller states
    event pcgen_mon_cov is @p_smp.clk;
    cover pcgen_mon_cov is {
        item state;
        transition state using illegal = not (
            (prev_state == PWR_UP_S and state == PSO_RQ1_S) or
            (prev_state == PSO_RQ1_S and state == PSO_RQ2_S) or
            (prev_state == PSO_RQ2_S and state == ISO_EN_S) or
            (prev_state == ISO_EN_S and state == RET_S) or
            (prev_state == RET_S and state == PSO_S) or
            (prev_state == PSO_S and state == PSO_DIS_S) or
            (prev_state == PSO_DIS_S and state == RES_S) or
            (prev_state == RES_S and state == ISO_DIS_S) or
            (prev_state == ISO_DIS_S and state == PWR_UP_S) or
            (prev_state == state)
        );
    };
};
```

In some embodiments, the power management UVC may be suitable for integration in a verification environment for performing simulation based functional verification of low power design. The same UVC may serve to verify an IP block with external power management, as well as an SoC that integrates many blocks and a power management sub-system. Using a single UVC for the various test benches ensures consistency. Having the UVC automatically generated from a CPF specification ensures adherence to the specification.

Figure 5:
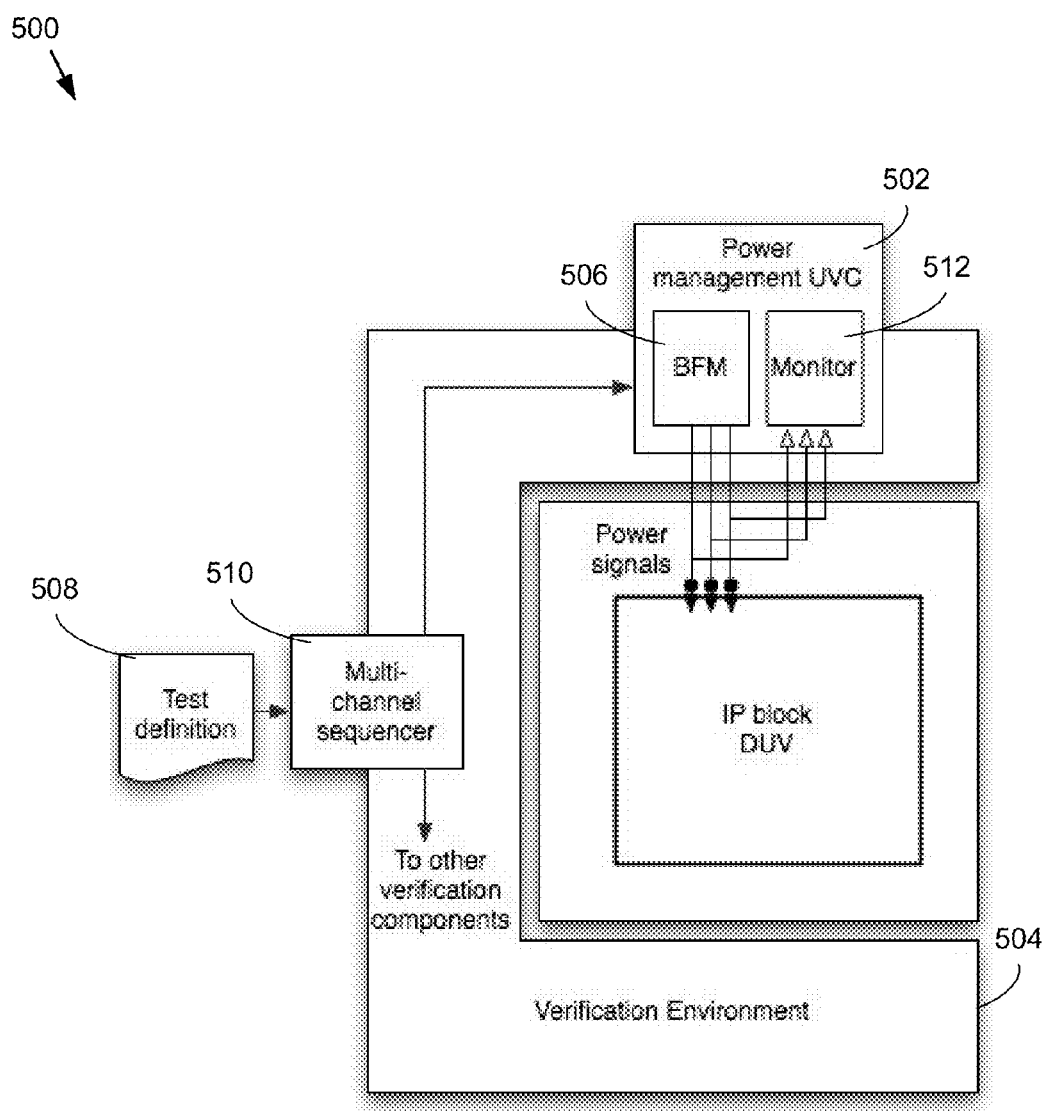
FIG. 5 is a diagram depicting an embodiment of a verification setup for an IP block consistent with an embodiment of the present disclosure.

Referring now to FIG. 5, an embodiment of a typical verification setup 500 for an IP block is provided. In some embodiments, power management UVC 502 may be integrated into a verification environment 504 that wraps around the IP block. Verification environment 504 may drive and monitor some or all of the blocks input and output ports, however this particular diagram only shows the power related ports. The power related ports may be hooked up to the outputs of the power management UVC BFM 506.

In some embodiments, test environment 504 may be driven by a test definition file 508 that may specify a top level sequence of events. The top level sequence may be executed by multi-channel sequencer 510, which may be the central point of control for all the DUV inputs. Power management related commands may be passed on to the power management UVC 502 for execution. In this way, a complex test involving multiple functional units as well as power management may be achieved.

In some embodiments, the power signals may be connected back to UVC monitor 512. Monitoring the sequence of operations may allow for coverage to be collected and stored. Coverage may then be analyzed to ensure power management was exercised sufficiently.

Figure 6:
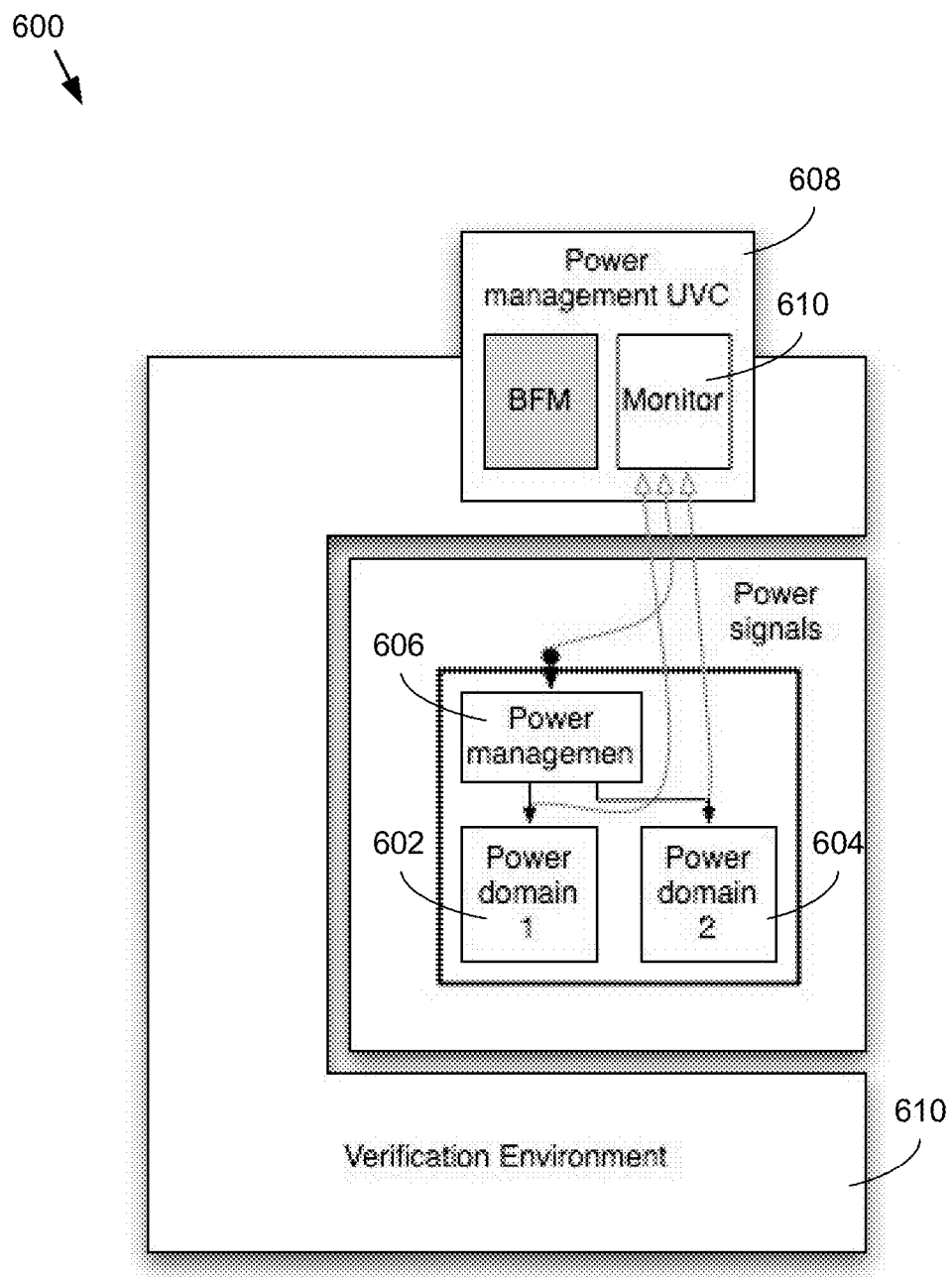
FIG. 6 is a diagram depicting an embodiment of a verification setup for a low-power SoC consistent with an embodiment of the present disclosure.

Referring now to FIG. 6, an embodiment of a typical verification setup 600 for a low power SoC is provided. In some embodiments, the SoC may include multiple power domains 602, 604 and a power management sub-system 606 that may be configured to control the power supplied to each domain. Power management sub-system 606 may implement the CPF specification regarding existing power modes and the sequencing of operations for switching between modes. The SoC may have some control inputs that affect power modes, for instance a pin that can force the SoC into hibernation. These inputs may be connected to power management sub-system 606 internally. They may be driven by the test bench as determined by the executing test.

In some embodiments, power management UVC 608 may be integrated into the SoC test environment 610 in a passive mode (e.g., it may not drive values, only read them). As shown in FIG. 6, the power management UVC 608 may be operatively connected to the inputs and outputs of power management sub-system 606. Power management UVC 608 may be configured to monitor these inputs and outputs and to trace the control operations using the monitor's 610 internal controller state machine. In some embodiments, monitor 610 may report errors if the sequence of power control operations fails to match the specification. Monitor 610 may also collect power mode state visitation and state transition coverage. The coverage may be saved in a database for analysis.

Figure 7:
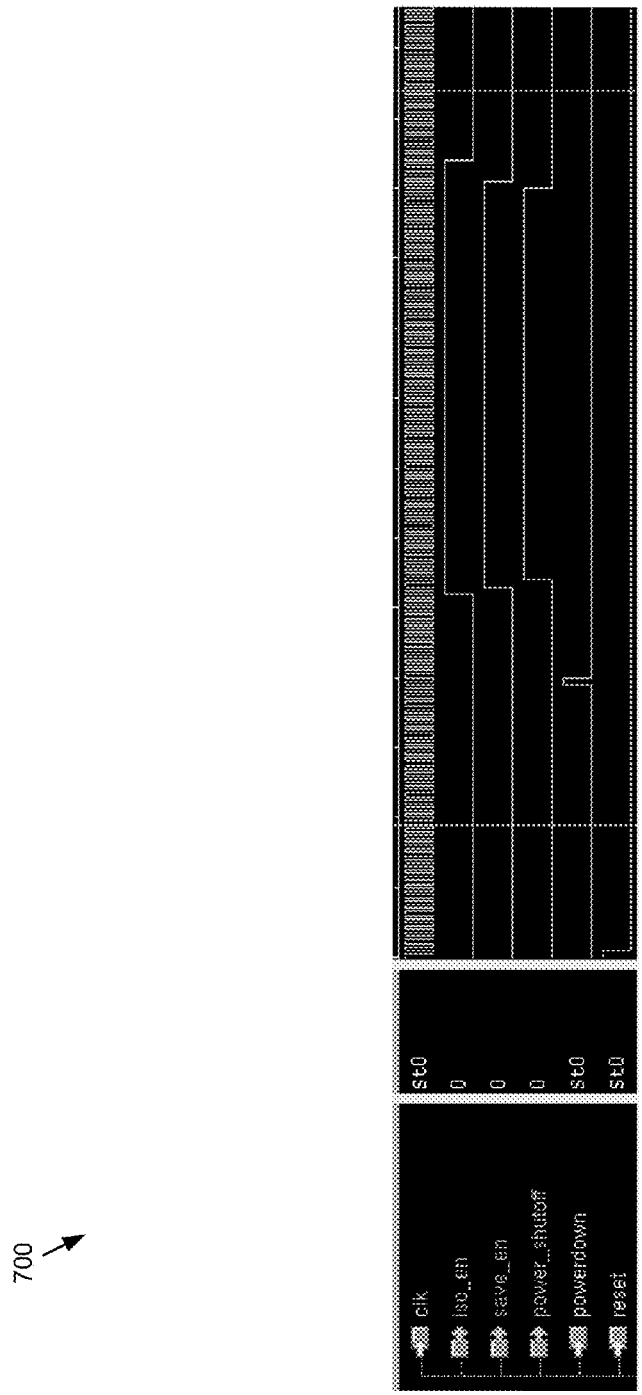
FIG. 7 is a diagram depicting an exemplary output of a power management UVC consistent with an embodiment of the present disclosure.
Figure 8:
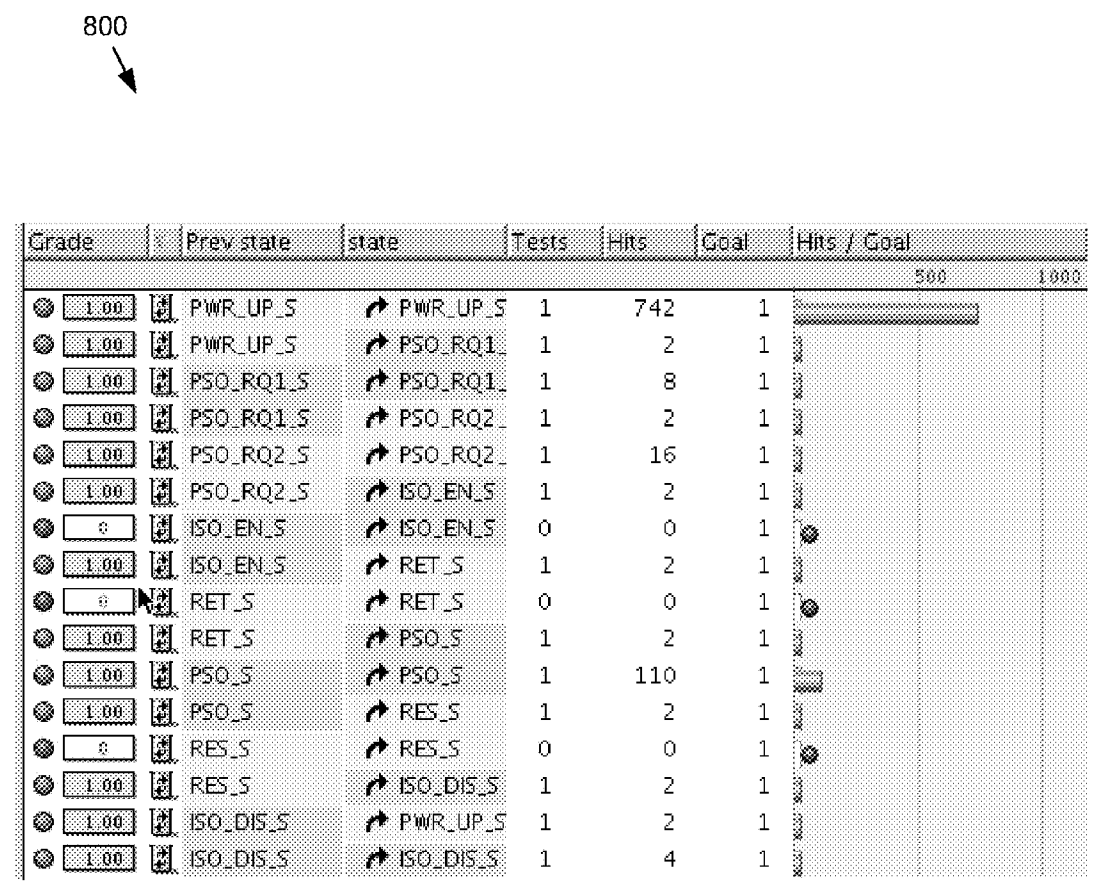

Referring now to FIGS. 7-8, exemplary output displays 700 and 800 are provided. Display 700 depicts an example of a waveform of power control signals from the power management UVC when it is in driving mode. More specifically, display 700 depicts the output of a driver BFM (the control signals switching power modes). Display 800 depicts a collected coverage example, which shows the coverage results collected by the monitor of the power management UVC.

Figure 9:
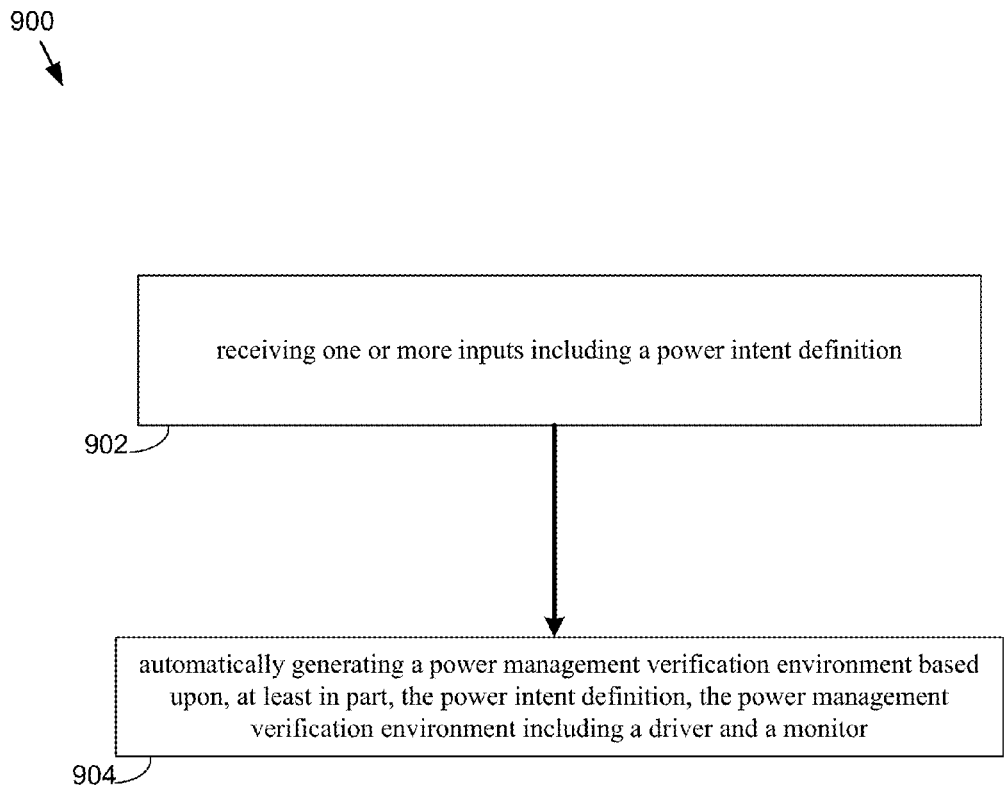
FIG. 9 is a flowchart depicting operations consistent with the automatic power management verification process in accordance with an embodiment of the present disclosure.

Referring now to FIG. 9, an exemplary flowchart 900 depicting operations consistent with the present disclosure is provided. Operations may include receiving one or more inputs including a power intent definition (902). Operations may further include automatically generating a power management verification environment based upon, at least in part, the power intent definition, the power management verification environment including a driver and a monitor (904). Numerous additional operations are also within the scope of the present disclosure.

Some or all of the teachings of the automatic power management verification process described herein may be integrated with other universal verification components (e.g., verification components adhering to the Universal Verification Methodology (UVM)). Additionally, the automatic power management verification process may provide the ability to connect various power components to other verification components. For example, a particular subsystem unit may be related to one or more of the power units. Further, it should be noted that the power aspect described herein may be connected to other aspects of the verification environment. For example, upon a particular change in power—issue a reset, etc. Moreover, the present disclosure is may be extended in a variety of different ways. For example, some users may want some checks that are not shown in this disclosure. In this way, the present disclosure may allow for additional changes not expressly described herein (e.g. alterations to the e code, etc.).

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for automatically generating a power management verification component comprising:
   receiving, using one or more computing devices, one or more inputs including a power intent definition;
   automatically generating a power management verification environment based upon, at least in part, the power intent definition, the power management verification environment including a driver and a monitor wherein the driver includes a bus functional model (BFM) driver and the monitor further includes a coverage collector.

2. The computer-implemented method of claim 1, wherein the driver includes a driving controller configured to provide power control signals to a design under verification (DUV).

3. The computer-implemented method of claim 1, wherein the monitor includes a monitor controller configured to receive power control signals from a design under verification (DUV).

4. The computer-implemented method of claim 1, wherein the power management verification environment further includes a sequencer configured to generate one or more input test sequences.

5. The computer-implemented method of claim 1, wherein the power management verification environment is generated, at least in part, using a parser configured to create an internal data structure representing one or more definitions found in the power intent definition.

6. The computer-implemented method of claim 5, wherein the internal data structure undergoes at least one of a synthesis phase and a code generation phase.

7. A system for automatically generating a power management verification component comprising:
   a computing device having at least one processor configured to receive one or more inputs including a power intent definition and to automatically generate a power management verification environment based upon, at least in part, the power intent definition, the power management verification environment including a driver and a monitor wherein the driver includes a bus functional model (BFM) driver and the monitor further includes a coverage collector.

8. The system of claim 7, wherein the driver includes a driving controller configured to provide power control signals to a design under verification (DUV).

9. The system of claim 7, wherein the monitor includes a monitor controller configured to receive power control signals from a design under verification (DUV).

10. The system of claim 7, wherein the power management verification environment further includes a sequencer configured to generate one or more input test sequences.

11. The system of claim 7, wherein the power management verification environment is generated, at least in part, using a parser configured to create an internal data structure representing one or more definitions found in the power intent definition.

12. The system of claim 11, wherein the internal data structure undergoes at least one of a synthesis phase and a code generation phase.

13. A non-transitory computer-readable storage medium for automatically generating a power management verification component, the computer-readable storage medium having stored thereon instructions that when executed by a machine result in one or more operations, the operations comprising:
   receiving one or more inputs including a power intent definition;
   automatically generating a power management verification environment based upon, at least in part, the power intent definition, the power management verification environment including a driver and a monitor wherein the driver includes a bus functional model (BFM) driver and the monitor further includes a coverage collector.

14. The computer-readable storage medium of claim 13, wherein the driver includes a driving controller configured to provide power control signals to a design under verification (DUV).

15. The computer-readable storage medium of claim 13, wherein the monitor includes a monitor controller configured to receive power control signals from a design under verification (DUV).

16. The computer-readable storage medium of claim 13, wherein the power management verification environment further includes a sequencer configured to generate one or more input test sequences.

17. The computer-readable storage medium of claim 13, wherein the power management verification environment is generated, at least in part, using a parser configured to create an internal data structure representing one or more definitions found in the power intent definition.

18. The computer-readable storage medium of claim 17, wherein the internal data structure undergoes at least one of a synthesis phase and a code generation phase.

\* \* \* \* \*